(12) United States Patent
Carter

(10) Patent No.: US 10,735,049 B2
(45) Date of Patent: Aug. 4, 2020

(54) POWER-LINE COMMUNICATIONS

(71) Applicant: NAUTITECH MINING SYSTEMS PTY LIMITED, New South Wales (AU)

(72) Inventor: Douglas Raymond Honda Carter, New South Wales (AU)

(73) Assignee: NAUTITECH MINING SYSTEMS PTY LIMITED, New South Wales (AU)

( * ) Notice: Subject to any disclaimer, the term of this patent is extended or adjusted under 35 U.S.C. 154(b) by 0 days.

(21) Appl. No.: 15/776,057

(22) PCT Filed: Oct. 28, 2016

(86) PCT No.: PCT/AU2016/051023
§ 371 (c)(1),
(2) Date: May 14, 2018

(87) PCT Pub. No.: WO2017/083907
PCT Pub. Date: May 26, 2017

(65) Prior Publication Data
US 2019/0341966 A1   Nov. 7, 2019

(30) Foreign Application Priority Data
Nov. 20, 2015   (AU) .............................. 2015258302

(51) Int. Cl.
*H04B 3/58*   (2006.01)
*H04B 3/54*   (2006.01)

(52) U.S. Cl.
CPC .............. *H04B 3/58* (2013.01); *H04B 3/542* (2013.01); *H04B 2203/5475* (2013.01)

(58) Field of Classification Search
CPC ... H04B 3/58; H04B 3/542; H04B 2203/5475
See application file for complete search history.

(56) References Cited

U.S. PATENT DOCUMENTS 3,911,415 A   10/1975   Whyte
8,947,258 B2   2/2015   Pant et al.
(Continued)

FOREIGN PATENT DOCUMENTS

WO   2003/077443 A1   9/2003

OTHER PUBLICATIONS

International Search Report dated Nov. 29, 2016 for International Application No. PCT/AU2016/051023, 5 pages.
(Continued)

*Primary Examiner* — Nader Bolourchi
(74) *Attorney, Agent, or Firm* — Knobbe, Martens, Olson & Bear, LLP

(57) ABSTRACT

A repeater (9), system (1) and method (100) for facilitating data communication, over a power-line (7), between a first electronic communication device (3) and a second electronic communication device (5). The repeater (9) includes a first power-line communication (PLC) transceiver (11), a second PLC transceiver (13) and a repeater communication channel (15). The first PLC transceiver (11) communicates with the first electronic communication device (3) over the power-line (7). The second PLC transceiver (13) communicates with the second electronic communication device (5) over the power-line (7). The first PLC transceiver (11) communicates with the second PLC transceiver (13) over the repeater communication channel (15).

21 Claims, 11 Drawing Sheets

(56) References Cited

U.S. PATENT DOCUMENTS

| | | | |
|---|---|---|---|
| 2005/0151718 A1 | 7/2005 | Vollmer et al. | |
| 2005/0177627 A1 | 8/2005 | Vollmer et al. | |
| 2005/0220004 A1 | 10/2005 | Vollmer et al. | |
| 2006/0097573 A1* | 5/2006 | Gidge | H04B 3/58 307/3 |
| 2007/0223381 A1 | 9/2007 | Radtke | |
| 2008/0106241 A1* | 5/2008 | Deaver | H02J 3/1828 323/209 |
| 2011/0140911 A1* | 6/2011 | Pant | H04B 3/546 340/870.02 |

OTHER PUBLICATIONS

Written Opinion of the International Searching Authority dated Nov. 29, 2016 for International Application No. PCT/AU2016/051023, 4 pages.
International Preliminary Report on Patentability dated Oct. 12, 2017 for International Application No. PCT/AU2016/051023, 32 pages.
Supplementary European Search Report for EP 16865291 dated Mar. 19, 2019.

* cited by examiner

POWER-LINE COMMUNICATIONS

CROSS REFERENCE TO RELATED APPLICATIONS

This application is the U.S. National Phase Application under 35 U.S.C. § 371 of International Application No. PCT/AU2016/051023 filed on Oct. 28, 2016, designating the U.S. and published as WO 2017/083907 A1 on May 26, 2017, which claims the benefit of Australian Patent Application No. 2015258302 filed on Nov. 20, 2015, which are hereby incorporated by reference in their entirety.

TECHNICAL FIELD

The present disclosure relates to power-line communications. This may include a method for power-line communications, a power-line communications system, and a device for power-line communications.

BACKGROUND

Power-line communications (PLC) involves transmitting data using power-line cables (power cables) as the data transmission medium. Power-line communications modems act as network bridges that convert data, for example, between an Ethernet network and the power-line.

In an underground coal mine, PLC may be used to transfer data between an enclosure on a mobile machine (e.g. longwall shearer, continuous miner) to an enclosure of a power centre (also known as a distribution and control box, DCB). Thus one power-line modem may be installed in each of these enclosures and the network data travels between them on a power cable connecting the power centre and mobile machine. In some alternatives, the PLC may be used to transfer data between an enclosure of stationary equipment (e.g. ventilation fans, pumps) and the power centre.

Power-line communications are an attractive option for data transmission in underground coal mines for the following reasons:
- they use the existing, rugged power-line for data transmission;
- no need to lay extra data transmission cables; and
- modem equipment may be housed in existing protective enclosures so that they are not exposed to mining environment.

However, the characteristics of power-line cables used in mining mean that effective data transmission is limited to power-line cable lengths. In some practical examples, effective data transmission may be at a maximum of approximately 500 m of a power cable between power-line modems.

SUMMARY

A repeater for facilitating data communication, over a power-line, between a first electronic communication device and a second electronic communication device, the repeater comprising: a first power-line communication (PLC) transceiver to communicate with the first electronic communication device over the power-line; a second PLC transceiver to communicate with the second electronic communication device over the power-line; and a repeater communication channel wherein the first PLC transceiver communicates with the second PLC transceiver over the repeater communication channel.

The repeater may allow data communication, over the power-line, over a longer length of power-line. Accordingly, the repeater may allow communication over the power-line for applications which would otherwise require communications medium such as a separate communication cable parallel to the power-line. By using the power-line, this may reduce costs, equipment, and labour associated with installing a communication system relying on other communications medium.

The repeater may include an interface module to transmit and receive a broadband over power-line signal. In one example, both the first and second PLC transceivers communicate with the respective first and second electronic communication devices through a single interface module.

In one example, the interface module is operative in: a first mode to transmit the broadband over power-line signal; or a second mode to receive the broadband over power-line signal, wherein the interface module alternates to operate in either the first or second mode.

The repeater may have data communication by half-duplex or full-duplex emulation.

The repeater may further comprise: a memory to store: a first channel identifier, associated with the first PLC transceiver, to communicate with the first electronic communication device; and a second channel identifier, associated with the second PLC transceiver, to communicate with the second electronic communication device.

In the repeater, the first channel identifier may comprise a first network membership key (NMK) and the second channel identifier comprises a second NMK.

The repeater communication channel may be a wired communication channel between the first and second PLC transceivers.

The repeater may be used in an underground communication network. The repeater may further comprise a flame-proof protective enclosure.

In a further example, the repeater may facilitate data communication, over a power-line, between the first electronic communication device, the second electronic communication device and a third electronic communication device. The repeater further comprising a third PLC transceiver to communicate with the third electronic communication device over the power-line, wherein the third PLC transceiver communicates with the first PLC transceiver and the second PLC transceiver over the repeater communications channel.

A system for data communication and power transmission, the system comprising: a first electronic communication device; a second electronic communication device; a power-line for transmission of power; a first power-line communication (PLC) transceiver to communicate with the first electronic communication device over the power-line; a second PLC transceiver to communicate with the second electronic communication device over the power-line; and a repeater communication channel to communicate the first PLC transceiver with the second PLC transceiver.

A system for data communication and power transmission, the system comprising: a first electronic communication device; a second electronic communication device; a power-line for transmission of power; and any one of the repeaters described above, wherein the first electronic communication device communicates with the repeater; and the repeater communicates with the second electronic communication device to facilitate data communication between the first electronic communication device and the second electronic communication device.

The system may further comprise a signal coupler configured to electrically couple the interface module to conductors of the power-line.

In the system at least one of the first electronic communication device, the second electronic communication device, and the repeater may be located at or proximal to a mobile mining machine to facilitate data communication with the mobile mining machine. In one alternative, the first electronic communication device, the second electronic communication device, and the repeater may be located at or proximal to stationary equipment in a mine to facilitate data communications with the stationary equipment.

In the system, at least one of the first electronic communication device, the second electronic communication device, and the repeater is located at or proximal to a distribution control box and/or power substation of a power-line network.

A method of facilitating data communication, over a power-line, between a first electronic communication device and a second electronic communication device, the method comprising the steps of: receiving, with a first power-line communication (PLC) transceiver, first data, over the power-line, from the first electronic communication device; sending, with the first PLC transceiver, the first data, over a repeater communication channel, to a second PLC transceiver; receiving, with the second PLC transceiver, the first data from the first PLC transceiver; and sending, with the second PLC transceiver, the first data, over the power-line, to the second electronic device.

The method may further comprise: receiving, with the second PLC transceiver, second data, over the power-line, from the second electronic device; sending, with the second PLC transceiver, the second data, over the repeater communication channel, to the first PLC transceiver; receiving, with the first PLC transceiver, the second data from the second PLC transceiver; sending, with the first PLC transceiver, the second data, over the power-line, to the first electronic device.

In the method, sending and receiving the first data and the second data may comprise sending and receiving, over the power-line, a broadband over power-line signal.

In the method, sending and receiving the first and second data between: the first PLC transceiver and the first electronic communication device; and the second PLC transceiver and the second electronic communication device, may be through an interface module. The interface module may operate in: a first mode to send the first or second data; or a second mode to receive the first or second data, wherein the interface module alternates to operate in either the first or second mode.

In the method, data communication may be by half-duplex or full-duplex emulation.

In the method sending and receiving the first and second data between first PLC transceiver and the first electronic communication device may be associated with a first channel identifier; and sending and receiving the second and first data between the second PLC transceiver and the second electronic communication device may be associated with a second channel identifier. The first channel identifier may comprise a first network membership key (NMK) and the second channel identifier may comprise a second NMK.

A method of configuring a data communication system, over a power-line, between a first electronic communication device and a second electronic communication device, wherein: the first electronic communication device is in communication, over the power-line, with a first power-line communication (PLC) transceiver; the second electronic communication device is in communication, over the power-line, with a second PLC transceiver, and wherein the first PLC transceiver is in communication, over a repeater communication channel, with the second PLC transceiver, the method comprising: storing, in a memory, a first channel identifier associated with the first PLC transceiver to communicate with the first electronic communication device; and storing, in a memory, a second channel identifier associated with the second PLC transceiver to communicate with the second electronic communication device.

The method may further comprise: receiving the first channel identifier, wherein the first channel identifier comprises a first network membership key (NMK); and receiving the second channel identifier, wherein the second channel identifier comprises a second NMK.

The method may further comprise: generating the first channel identifier and second channel identifier.

BRIEF DESCRIPTION OF DRAWINGS

Examples of the present disclosure will be described with reference to.

DESCRIPTION OF EMBODIMENTS

Overview

Figure 1:
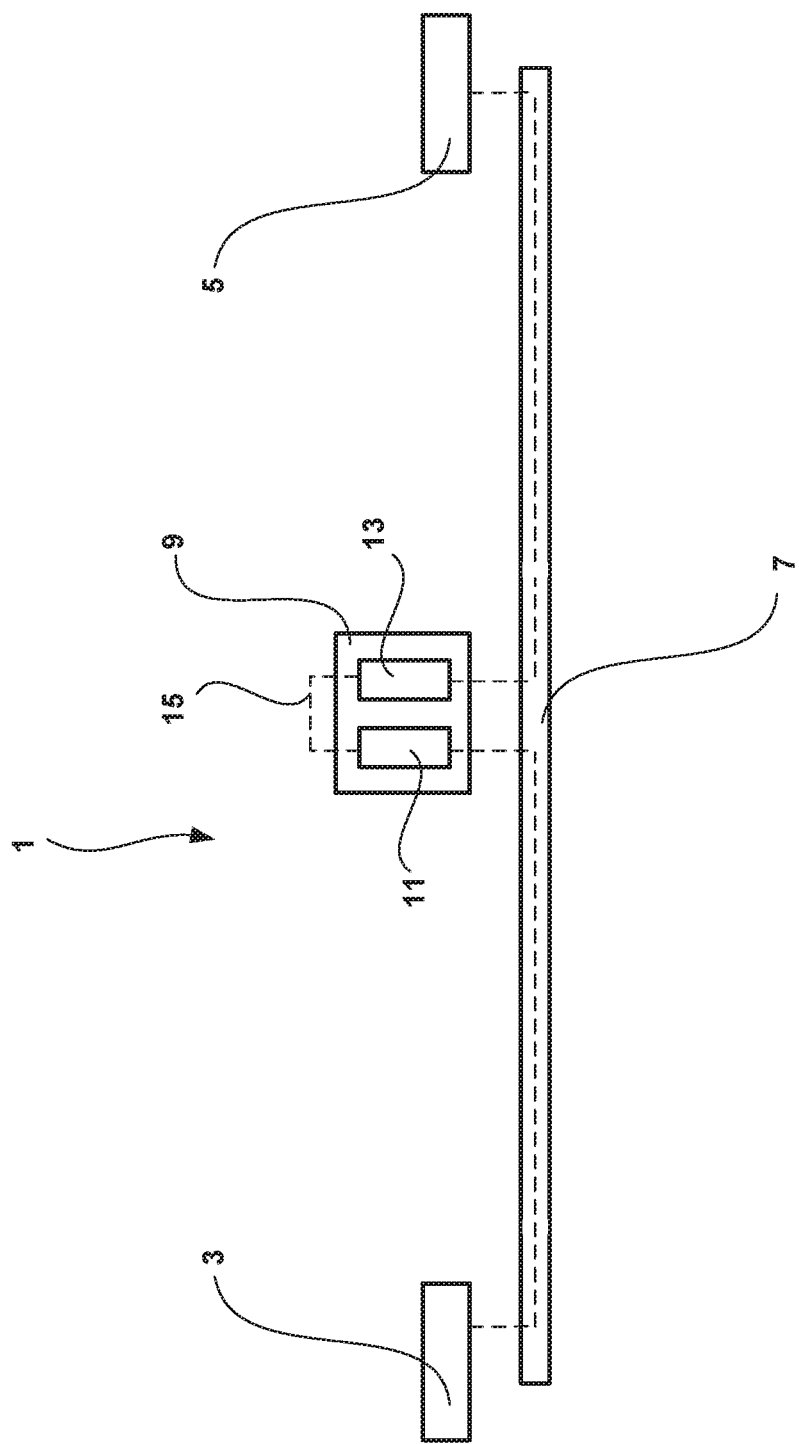
FIG. 1 is an example of a system for data communication over a power-line.
Figure 2:
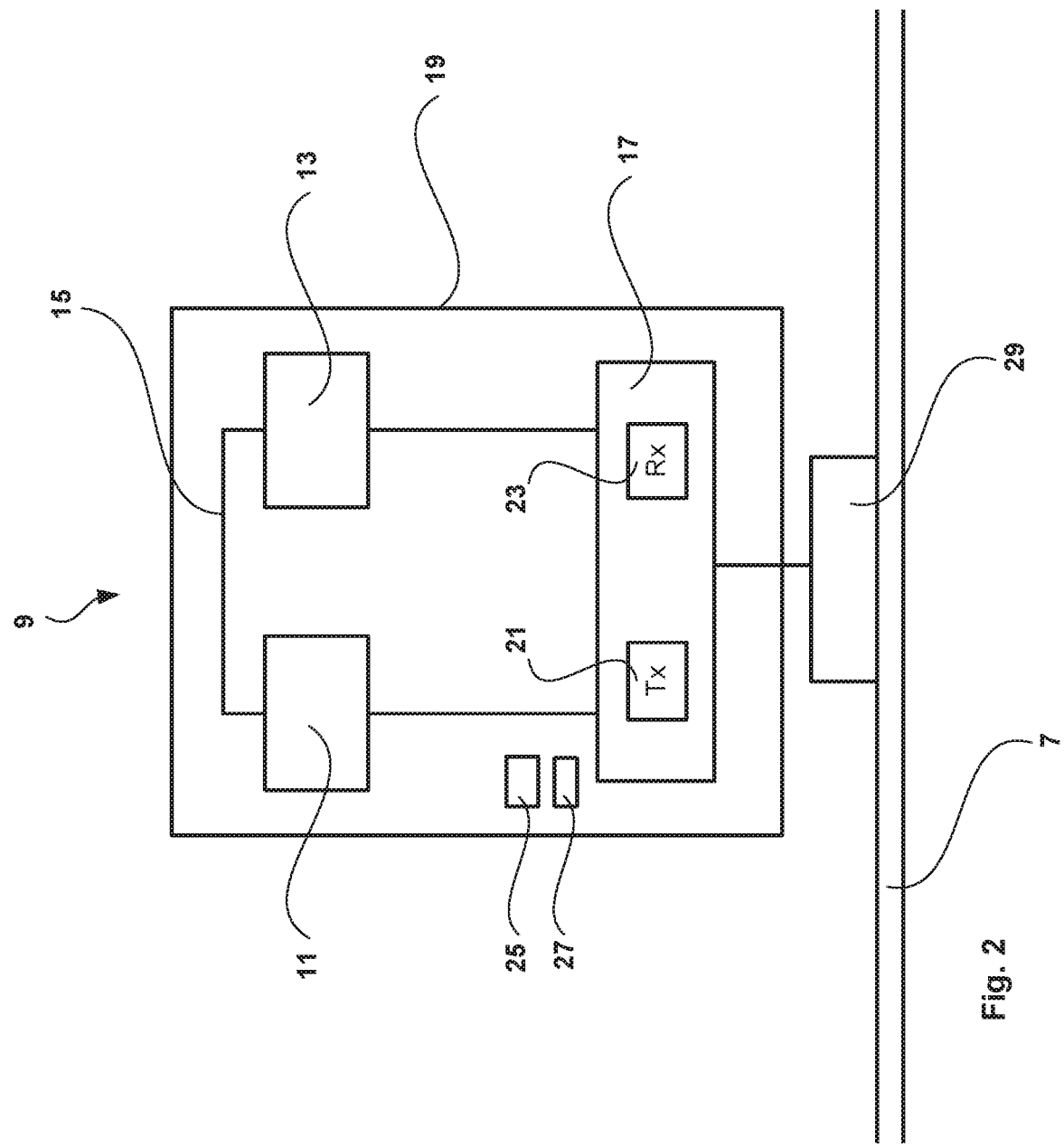
FIG. 2 is an example of a repeater used to facilitate data communication in the system of FIG. 1.

A system 1 for data communication, over a power-line, will now be described with reference to FIGS. 1 and 2. The system 1 includes a first electronic communication device 3 and a second electronic communication device 5 and a power-line 7. The power-line 7 transmits power as well as carrying at least one signal for data communication between the first and second electronic communication device 3, 7. A repeater 9 is in communication, over the power-line 7, with both the first electronic device 3 and the second electronic device 7 to facilitate data communication therebetween.

The repeater 9 includes a first power-line communication (PLC) transceiver 11 to communicate with the first electronic communication device 3 over the power-line 7. The repeater 9 also includes a second PLC transceiver 13 to communicate with the second electronic communication device 5 over the power-line 7. The repeater 9 also includes a repeater communication channel 15 wherein the first PLC transceiver 11 communicates with the second PLC transceiver 13 over the repeater communication channel 1915.

A method 100 of facilitating data communication, over a power-line 7, between a first electronic communication device 3 and a second electronic communication device 5 with the repeater 9 will now be described with reference to FIG. 4. The method 100 may include the repeater 9 receiving 110, with the first PLC transceiver 11, first data, over the power-line 7, from the first electronic communication device 3. The method 100 further includes sending 120, with the first PLC transceiver 11, the first data, over a repeater communication channel 15, to the second PLC transceiver 13. In turn, the method 100 includes receiving 130, with the second PLC transceiver 13, the first data from the first PLC transceiver 11. The method 100 then includes sending 140, with the second PLC transceiver 13, the first data, over the power-line 7, to the second electronic device 5.

The repeater 9 may allow data communication between the first electronic device 3 and the second electronic device 7, along a power-line 7, over a greater distance than may otherwise be achieved. For example, a signal travelling through a transmission medium (such as a power-line) will suffer attenuation losses. Attenuation of the signal (amongst other things) may limit the effective distance that a signal can travel through the transmission medium. Thus a repeater 9, by receiving and (re)transmitting signals with the first and second transceivers 11, 13 can extend the effective distance between the first and second electronic communication device 3, 5.

Furthermore, the separate repeater communication channel 15 allows the first and second PLC transceivers 11, 13 to communicate with each other without using the power-line 7. This may avoid, or mitigate, problems with the PLC transceivers 11, 13 trying to communicate with each other on a crowded power-line 7. Furthermore, this configuration may allow the first and second PLC transceivers to be sourced, or adapted, from commercially available PLC transceiver integrated circuits. This may simplify production and/or lower the cost of the repeater 9.

The repeater 9 may be used for data communications in industrial environments. For example, in a mining environment, electric power may be supplied to equipment with power-line cables. Such power-line cables may be ruggedized cables to withstand heat, blast, dust, etc. in such environments. By using repeaters 9, a data communication system 1 may be implemented using existing power-lines 7 that connect various equipment that can lower the set up costs. Furthermore, it may reduce complexity as the power-line 7 needs to be maintained as opposed to having a power-line and a separate wired communication link.

The system 1 and repeater 9 may be suitable for use in an underground mining environment, where it may be more suitable to supply power equipment through power cables as opposed to fossil fuel generators/engines at the equipment. This may be due to a number of factors, including fumes in confined spaces, fire and explosion risks. In particular, coal mines may have hazardous atmospheres that contain combustible components, such as methane and coal dust. Furthermore, wireless communications in an underground environment poses difficulties, such as signal multi-path and lack of line of sight, and therefore communications through a wired means (such as the power-line 7) may provide more reliable communications.

An Example of the System 201 in an Underground Mine 200

Figure 3:
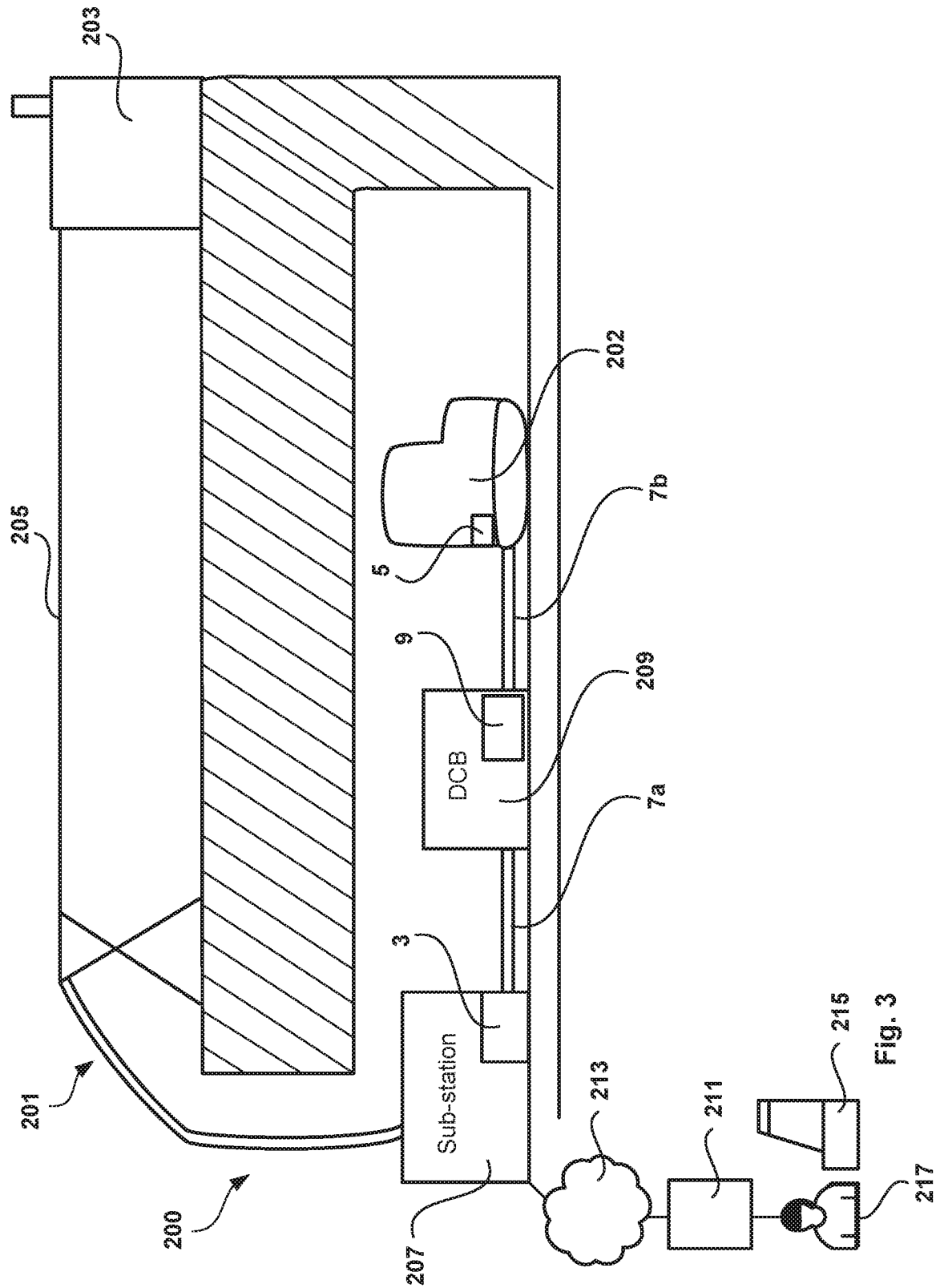
FIG. 3 is another example of a system for data communications, over a power-line, in an underground mine.

An example of a system 201 will now be described in detail with reference to FIG. 3. The system 201 may be used in an underground mine 200. In an underground mine 200, mining operations may include a mobile mining machine 202, such as a continuous mining machine, longwall shearer, trucks, loaders, dozers etc. The mobile mining machine 202 may be electrically powered from a generator or power plant located remote from the mining machine 202 and/or the underground mine 200. In one example, power is generated at a power plant 203 and power is transmitted by high voltage power-lines 205 to a power substation 207. At the power substation 207, high voltage power may be transformed to a lower voltage for transmission through a first section of power-line 7a. The first section of power-line 7a supplies power through a distribution control box (DCB) 209 to a second section of power-line 7b, which in turn supplies power to the mobile mining machine 202.

The power-line 7 may be formed of the first section of power-line 7a that is electrically connected to the second section of power-line 7b, where the first and second sections 7a, 7b are each a power-line cable. Thus the first section of power-line 7a may be electrically connected to a distribution bus at the DCB 209, and in turn, one or more second section of power line 7b may be connected to the distribution bus at the DCB 209. In some alternatives, the power-line 7 may be a single continuous power-line with both the first and second sections of power line 7a, 7b and where a DCB 209 may be electrically coupled to the power line. The DCB 209 may distribute power to multiple mobile mining machines 202.

In addition to supplying power to the mobile mining machine 202, it may be desirable for the mobile mining machine 202 to have data communication with one or more nodes 211 in a mine communication network 213. The network node 211 may be part of a control station 215 that sends and/or receives data to the mobile mining machine 202. For example, an operator 215 may wish to monitor and/or control the mobile mining machine 202, from the control station 215.

To facilitate communications the node 211 may be in communication with the first electronic communication device 3, which in turn, is in communication with a first transceiver 11 of a repeater 9. The first PLC transceiver 11 of the repeater 9 is in communication, over a repeater communication channel 15, with the second PLC transceiver 13 of the repeater 9. In turn, the second PLC transceiver 13 is in communication with a second electronic communication device 5 associated with the mobile mining machine 202. Thus this allows data communication between the mobile mining machine 202 and the first node 211. It is to be appreciated that the mobile mining machine 202 may also be in communication with other nodes that may be in communication with the network 213.

This system 201 may allow data from sensors and/or processing devices at the mobile mining machine 202 to be sent to, and received by, the control station 215 (or other nodes). This may also allow the control station 215 (or other nodes) to send control signals to the mobile mining machine 202. The system 201 using power-line for data communication may be more reliable than wireless data communication in the underground mine 200. The system 201 may also use existing (or modified) components, such as ruggedized power-lines, which may reduce costs and complexity compared to other alternatives.

Although the above example describes data communication with a mobile mining machine 202, it is to be appreciated that the system 201 may be used to facilitate data communication with stationary equipment (e.g. ventilation fans, pumps, etc.) in a mine. Therefore in one alternative, the second electronic communication device 5 may be located at, or proximal to, the stationary equipment such that the stationary equipment can be in data communication with other nodes in the network.

The Repeater 9

An example of the repeater 9 will now be described in detail with reference to FIG. 2. The repeater 9 includes the first PLC transceiver 11 that communicates with the second PLC transceiver 13 over the repeater communication channel 15. An interface module 17 is provided in the repeater 9, through which the PLC transceivers 11, 13 communicate with respective electronic communication devices 3, 5. The above mentioned components of the repeater may be housed in an enclosure 19.

The First and Second PLC Transceivers 11, 13

The first and second PLC transceivers 11, 13 in one example, include an integrated circuit to receive data from broadband power-line modem (BPLM) signals (e.g. IEEE 1901) and, in turn, to transmit the data with Ethernet signals (e.g. IEEE 802.3). The integrated circuit may also receive data from Ethernet signals and transmit the data with BPLM signals. The PLC transceivers may include analogue-to-digital converters, digital-to-analogue converters, adaptive gain control, filters, line drivers, etc. Such PLC transceivers may include those that are used in commercially available BPLM devices, such as Qualcomm AR6400/AR1400, AR7400/AR1500, Sigma Designs CG2211/CG2212. Commercial off the shelf PLC transceivers, or modifications thereof, may be used in the repeater 9 to reduce costs.

Repeater Communication Channel 15

The repeater communication channel 15 may be a wired communication channel between the first and second PLC transceivers 11, 13. A wired communication channel may increase the reliability of data communication between the transceivers 11, 13. However, it is to be appreciated that in some alternatives, the repeater communication channel 15 may include a wireless communication channel such as through Bluetooth protocols/standards (IEEE 802.15.1) or Wi-Fi (IEEE 802.11).

The repeater communication channel 15 is separate to channels used for communication, over the power-line 7, used between the first electronic communication device 3 and the first PLC transceiver 11, and the second electronic device 5 and the second PLC transceiver 13. The separate repeater communication channel 15 may allow the first and second transceivers 11, 13 to communicate with low voltage logic levels, as opposed to modifying the signals to BPLM signals and using the power-line as the transmission medium. Furthermore, it may prevent unwanted data exchange at the repeater 9. In an illustrative example, first data is to be transmitted from the first electronic communication device 3, through the repeater 9, to be received by the second electronic communication device 5. By having the first data transmitted between the PLC transceivers 11 and 13 on a separate repeater communication channel 15, this may reduce the likelihood of the data communication between the PLC transceivers 11, 13 interfering with (or taking bandwidth from) communication between PLC transceivers 11, 13 with respective electronic communication devices 3, 5.

Interface Module 17

The interface module 17 may include a transmitter interface 21 and a receiver interface 23. The transmitter interface 21 receive signals from the PLC transceivers 11, 13 and perform signal conditioning such that signals are suitable for the capacitive coupler/inductive coupler/isolation barrier (to be discussed below) to inject a broadband over power-line signal onto the power-line. This may include amplification of signal from the PLC transceivers 11, 13. Conversely, the receiver interface 23 may receive signals from the capacitive coupler/inductive coupler/isolation barrier and perform signal conditioning such that signals are suitable to be received by the PLC transceivers 11, 13. The interface module 17 may include components to protect the PLC transceivers 11, 13 from excessive electrical voltages/currents and/or thermal conditions.

In this example, the interface module 17 is a common module shared by both the first PLC transceiver 11 and the second PLC transceiver 13. It may be desirable for the interface module 17 to be in either a first mode to transmit the broadband over power-line signal, or a second mode to receive the broadband over power-line signal. The interface module 17 may alternate to operate in either the first or second mode to allow duplex communication.

The transmitter and receiver interfaces 21, 23 may be analogue signal processing blocks. When operating in the first (transmit) mode the receiver interface 23 protects the first and second PLC transceivers 11, 13 from the full signal strength of signals transmitted from the transmitter interface 21. The receiver interface 23 may protect the PLC transceivers 11, 13 by being in an "OFF" mode to isolate signals from being received by the PLC transceivers.

The interface module 17 may further include data buffers. In one example, this may include buffering data received from the PLC transceivers 11, 13 whilst the interface module 17 is in the second mode (i.e. when the receiver interface 23 is receiving BPLM signals). This may allow the first and second PLC transceivers 11, 13 to send and receive data through the interface module 17 whilst been agnostic to whether the interface module 17 is in the first or second mode. However, it is to be appreciated that in some examples, communication of the first and second PLC transceivers 11, 13 with respective electronic communication devices 3, 5 may be synchronised (such as by time) with operation of the interface module 17 in the respective modes. In other examples, the first and second PLC transceivers 11, 13 may include buffering and collision avoidance at the PLC transceivers.

Having a common interface module 17 in the repeater 9 may also reduce the size, weight, and costs compared to an alternative system that may have an interface module 17 for each of the first and second PLC transceivers 11, 13.

Channels and Channel Identifiers

In some examples, a first channel identifier is associated with the first PLC transceiver 11, and a second channel identifier associated with the second PLC transceiver 13.

The channel identifiers are in turn associated with respective first and second channels, whereby the first channel is for communication between the first electronic communication device 3 and the first PLC transceiver 11 and then second channel is for communication between the second electronic communication device 5 and the second PLC transceiver 13. It is to be appreciated that the channels may be a physical channel and/or logical channel Physical channels may be based on frequency and/or timeslot. Logical channels may be based on code(s) associated with the logical channel.

In some examples, the channel identifier may be a frequency, channel number, timeslot, code, including network membership keys (NMK). The first and second channel identifiers, configuration thereof, and advantages, will be described in further detail below.

The separate first and second channel identifiers (and corresponding first and second channels) may prevent, or reduce, unintentional data exchange that may result in a data loop. A data loop may be illustrated in the following example where the first and second electronic communication devices 3, 5 and the first and second PLC transceivers 11, 13 are on the same channel. In this case, first data sent from the first electronic communication device 3, over the power-line 7, may be (unintentionally) received by the second PLC transceiver 13. The second PLC transceiver 13, in response to receiving the first data (from the power-line 7 instead of the first transceiver 11), may then send the first data, over the repeater communication channel 15 to the first PLC transceiver 13. The first PLC transceiver 13 may then, in turn, send the first data back to the first electronic communication device 3 (which was the source of the first data).

Therefore in some examples, it may be desirable to have first and second channel identifiers (with associated channels) for communication for respective first and second PLC transceivers 11, 13 (and associated electronic communications devices) to prevent, or reduce, the risk of a data loop.

Memory 25 and Processing Device 27

The repeater 9 may also include a memory 25 and processing device 27. The memory 25 and/or processing device 27 may be integral with one or more of the PLC transceivers 11, 13 or, in some examples, are separate or in addition to the PLC transceivers 11, 13 (or combinations thereof).

The memory 25 may store configurations for the repeater 9, such as first and second channel identifiers associated with communication with, respectively, the first and second electronic communication devices 3, 5.

The memory 25 may also contain machine-readable instructions. The processing device 27 may perform machine-readable instructions from the memory 25 to perform the method 100. An example of a processing device 27 will be also discussed in further detail below.

The Enclosure 19

The enclosure 19 houses components of the repeater 9. In some examples, the enclosure 19 may include features desirable for use in an underground mine 200. For example, the enclosure 19 may include a flameproof protective enclosure. Such enclosures may include seals to prevent, or reduce the risk, ignition sources from the repeater 9, or the system 1, 201, from igniting flammable gas or other material in the underground mine.

In some other examples, the repeater 9 (including the enclosure 19) may be received in a separate flameproof protective enclosure. For example, a DCB 209 may have a separate flameproof protective enclosure for electrical, electronic, communication equipment, distribution bus, etc. Thus in some examples, the separate flameproof protective enclosure may receive the repeater 9 and the other items that may be an ignition source. This may be useful, for example, if the repeater 9 and other components require ventilation for cooling the components. Therefore in some examples the enclosure 19 may have vents to assist cooling and airflow in the separate flameproof protective enclosure, which in turn may have a heat dissipation system for the air within the separate flameproof protective enclosure. The heat dissipation system may include a fan and a heatsink.

Sockets and connector interfaces (not shown) may be provided at, or through apertures, in the enclosure 19 to allow connection with cables to other components in the system 1. This may include a power source, a power-line bus cable (for connection with the capacitive coupler discussed below), Ethernet connector, remote display output, etc.

It is to be appreciated that in some examples, some components of the repeater 9 may be housed in the enclosure 19 and some external to the enclosure 19. For example, in some examples, the first PLC transceiver 11 and second PLC transceiver 13 communicate over the Ethernet standard (IEEE 802.3) and the repeater communication channel includes a wired communication channel (such as a category 5 cable) whereby the wired communication channel is, at least in part, external to the enclosure. In these examples, the first and second PLC transceivers 11, 13 may each be associated with a connector interface (such as RJ45) accessible through apertures on the surface of the enclosure 19. To complete the repeater communication channel 15, a cable (such as a category 5 cable) may be connected to the respective connector interfaces associated with the PLC transceivers 11, 13.

Capacitive Coupler 29

A capacitive coupler 29 may provide signal coupling between the repeater 9 and the power-line 7. Examples of capacitive couplers include the capacitive coupler ME1228-0-00-029 offered by Nautitech Mining Systems Pty Ltd, Australia.

In some examples, the repeater 9 has a common interface module 17 to send and receive signals in alternate first and second modes. Accordingly, the common interface module 17 may be connected to a common capacitive coupler for both coupling a signal onto the power-line 7 and coupling a signal from the power-line 7. This may save having additional couplers associated with the first and second PLC transceivers 11, 13 and/or additional couplers associated with sending and receiving data.

It is to be appreciated that other devices for providing and receiving a signal to the power-line 7 may be used. Examples include inductive couplers to provide signal coupling between the repeater 9 and the power-line 7.

Broadband Over Power-Line Modem

The first and second electronic communication devices 3, 5 may include broadband over power-line modems (BPLM). In particular, these may be BPLM that are configured to communicate with the repeater 9 using BPLM signals. The first and second electronic communication devices 3, 5 may be associated with the respective first and second channel identifiers for communication with respective first and second PLC transceivers 11, 13. The BLPM may also be in communication with the network 213.

The BPLM may utilise BPLM signals including, but not limited to the following standards: IEEE 1901 (HomePlug AV), ITU-T G.9960/1 (G.hn), ITU-T G.9903 (G3-PLC), ITU-T G.9904 (PRIME), IEC 61334-5-1, where the names in the parentheses indicate common names given to these standards, or examples of these standards.

Method of Facilitating Data Communication 100

The method of facilitating data communication 100 will now be described in further detail with reference to FIGS. 4 and 5.

Transmission of First Data in a First Direction A

Figure 4:
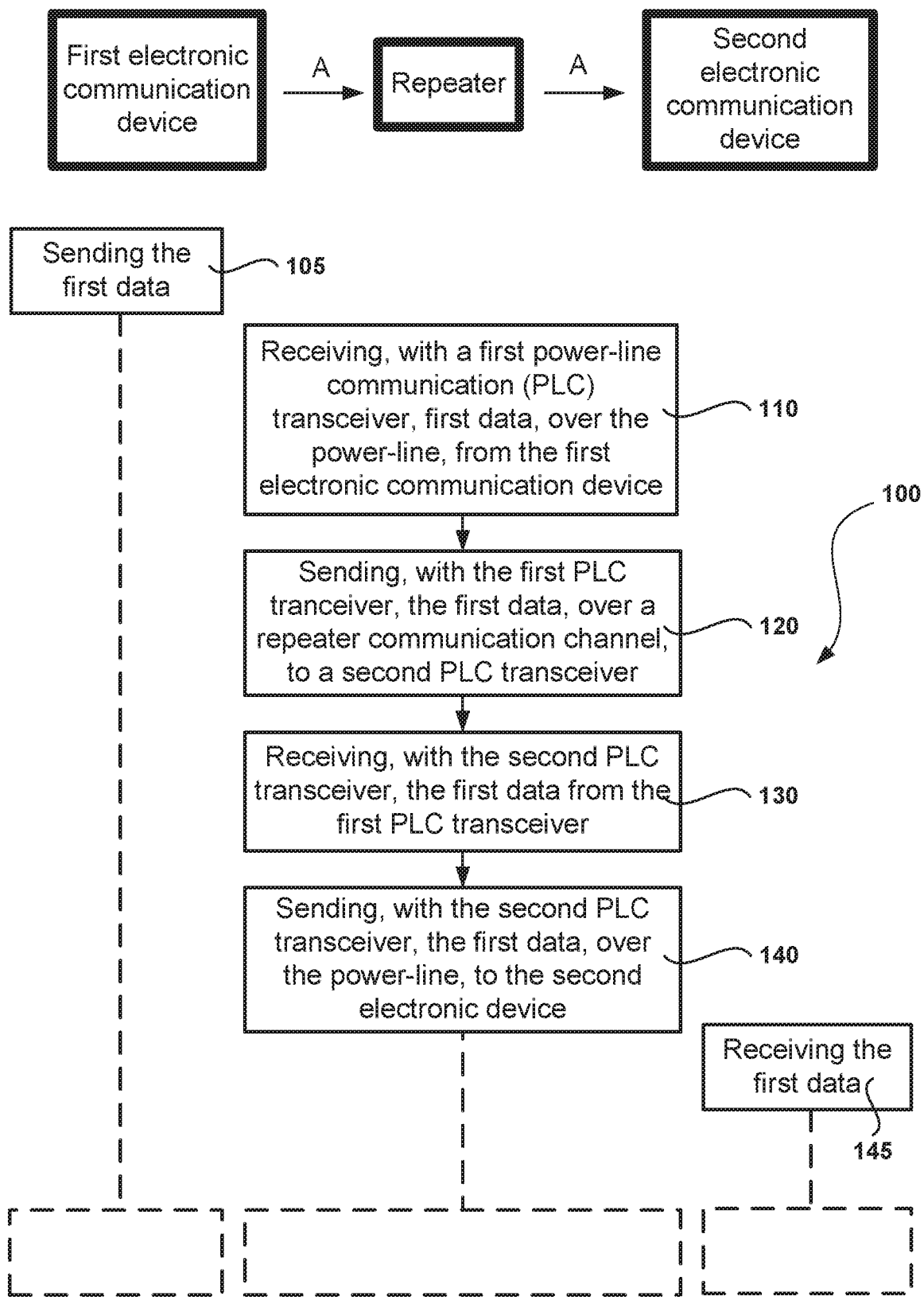
FIG. 4 is an example of a method for facilitating data communication over a power-line.

FIG. 4 illustrates a method of sending first data, in a first direction A, from the first electronic device 3, via the repeater 9, to the second electronic device 5. At step 105, the first electronic communication device 3 sends first data, over the power-line 7, to the first PLC transceiver 11. The method 100 includes receiving 110, with the first PLC transceiver 11, the first data, over the power-line 7, from the first electronic communication device 3. Subsequently, the method includes sending 120, with the first PLC transceiver 11, the first data, over the repeater communication channel 15, to the second PLC transceiver 13. In turn, the method 100 includes the second PLC transceiver 13 receiving 130 the first data from the first PLC transceiver 11. The method then includes the second PLC transceiver 13 sending 140 the first data, over the power-line 7, to the second electronic device 5. At step 145, the second electronic device receives, over the power-line 7, the first data.

Transmission of Second Data in a Second Direction B

Figure 5:
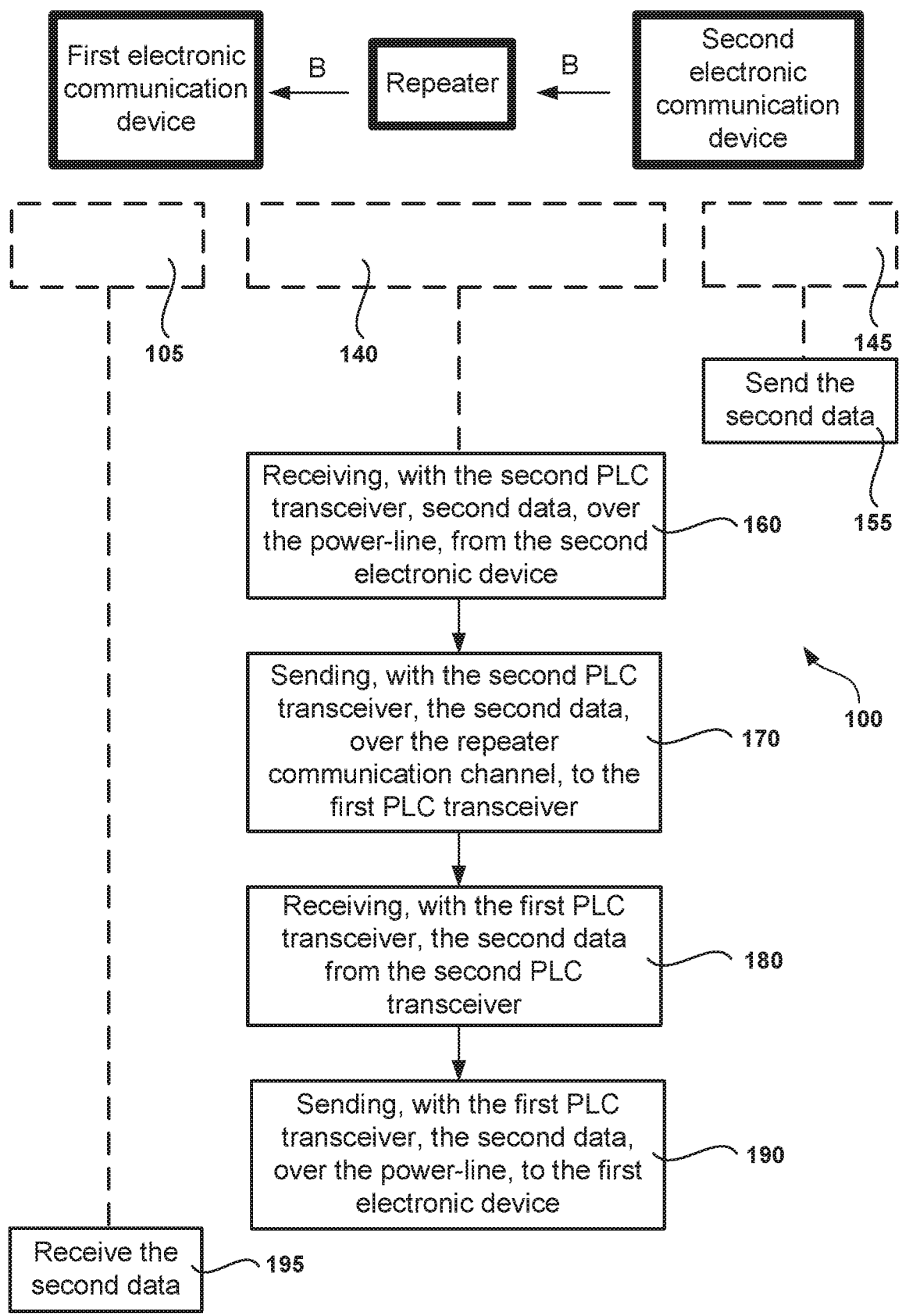
FIG. 5 is a further example of the method in FIG. 4.

FIG. 5 illustrates the method 100 that further includes sending second data, in a second direction B, from the second electronic device 5, via the repeater 9, to the first electronic device 3. At step 155, the second electronic communication device 5 sends second data, over the power-line 7, to the second PLC transceiver 13. The method 100 includes receiving 160, with the second PLC transceiver 13, the second data, over the power-line 7, from the second electronic communication device 5. The method 100 then includes sending 170, with the second PLC transceiver 13, the second data, over the repeater communication channel 15, to the first PLC transceiver 11. In turn, the method 100 includes the first PLC transceiver 11 receiving 180 the second data from the second PLC transceiver 13. The method further includes the first PLC transceiver 11 sending 190 the second data, over the power-line 7, to the first electronic communication device 3. At step 195, the first electronic communication device receives, over the power-line 7, the second data.

Alternating Modes of the Interface Module 17

In the above examples, the interface module 17 of the repeater 9 may operate in a first mode to send data or a second mode to receive data. In particular, this may include a first mode where, via the transmitter interface 21, the first or second data is sent from the repeater 9 at steps 140, 190. This may also include a second mode where, via the receiver interface 23, the first or second data is received by the repeater 9 at steps 110, 160. In one example a common interface module 17 may alternate to operate in either the first or second mode. As noted above, this may be useful to prevent, or reduce, issues with exposing (via the receiver interface 23) the PLC transceiver 11, 13 to a full strength signal transmitted in close proximity by the transmitter interface 21. In particular, when in the first mode, the receiver interface 23 is "OFF" to protect the PLC transceivers 11, 13.

Duplexing

The above illustrative example in FIGS. 4 and 5 includes half-duplex data communication between the first electronic communication device 3 and the second electronic communication device 5. That is, data communication in both directions A and B between the electronic communication devices 5, but, at different times. It is to be appreciated that determination of transmission of data in the respective directions may alternate by time, or by polling.

In further embodiments, the data communication between the first and second electronic devices 3, 5 may be with full-duplex emulation through the repeater 9. For example, the electronic communication devices 3, 5 and the repeater 9 may include duplexing methods such as time-division duplexing and/or frequency-division duplexing. This may allow emulation of simultaneous two way communication between the first and second electronic devices 3, 5.

Method of Configuring a Data Communication System 1

As noted above, a first and second channel identifier may be associated with communication between respective electronic devices 3, 5 and the PLC transceivers 11, 13. Thus there is also disclosed a method 300 of configuring a data communications system 1 that includes configuring the data communications system 1 with first and second channel identifiers.

Figure 6:
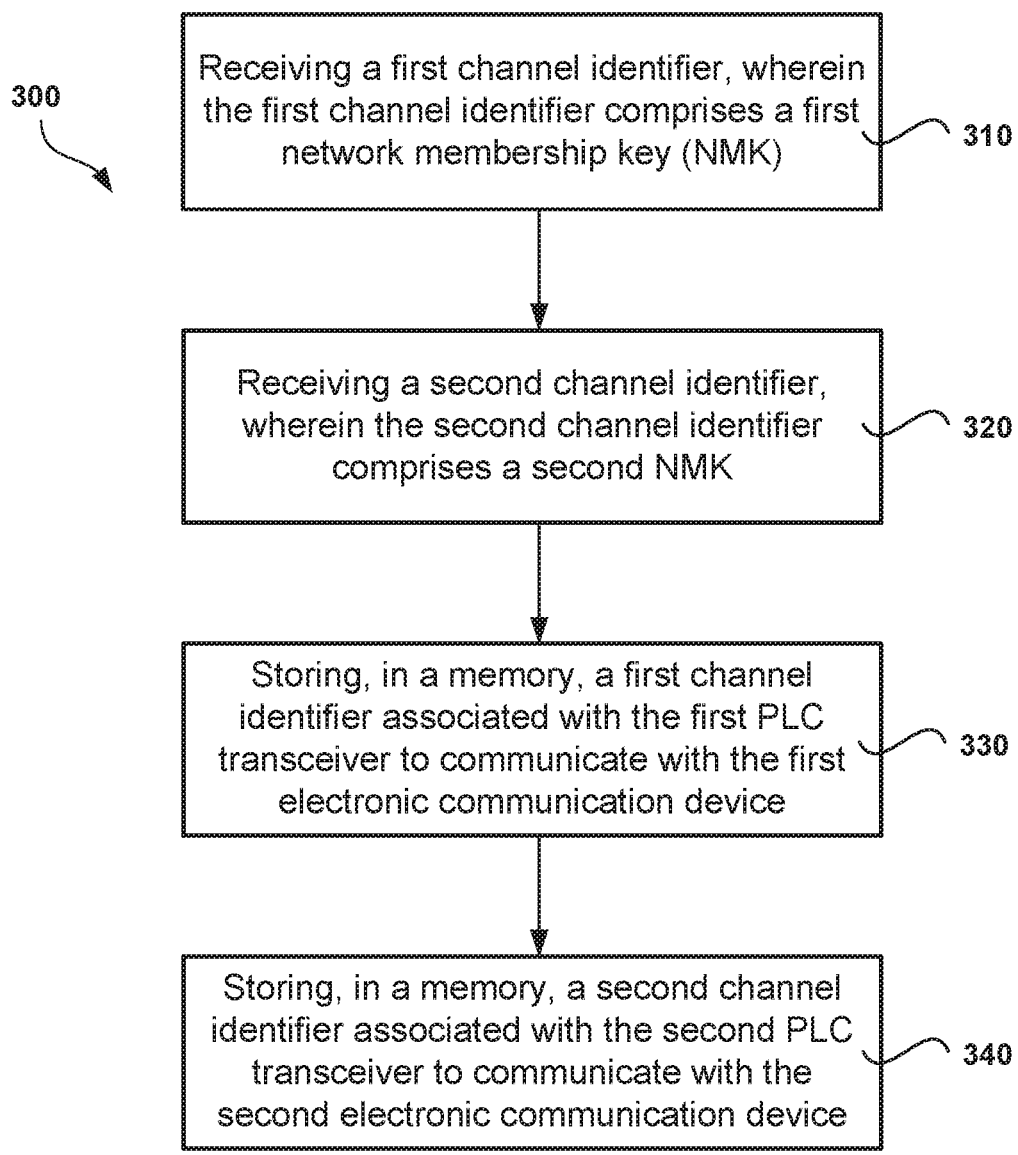
FIG. 6 is an example of a method of configuring a data communication system.

Referring to FIG. 6, the method 300 includes the repeater 9 receiving 310 the first channel identifier associated with the first PLC transceiver 11 and receiving 320 the second channel identifier associated with the second PLC transceiver 13. The method 300 further includes storing 330, in the memory 25, the first channel identifier and storing 340, in the memory 25, the second channel identifier.

The first electronic communication device 3 is configured with the first channel identifier to allow communication with the first PLC transceiver 11, which may include storing the first channel identifier with a memory associated with the first electronic communication device 3. Similarly, the second electronic communication device 5 may be configured with the second channel identifier to allow communication with the second PLC transceiver 13.

In some examples, the first channel identifier is a first NMK and the second channel identifier is a second NMK, wherein the first and second NMK are different to prevent, or reduce the likelihood, of data loops. The NMK may be assigned for the particular system 1. This may include one or more NMK specified by a user and/or by an operator manual, etc.

In some examples, the method may include generating the first NMK and the second NMK by a processing device. This may include a processing device to determine appropriate first and second NMK suitable for a system 1, for example, so that the generated NMK are not the same as other NMK that may be used in the system 1.

Variations

Variation of the Repeater 9'

A variation of a repeater 9' will now be described with reference to FIG. 7. In this example, the repeater 9' includes two interface modules 17', 17", one for each of the first and second PLC transceivers 11, 13. In turn, the two interface modules 17', 17" are connected to corresponding capacitive couplers 29', 29". Accordingly, the first transceiver 11 communicates with the first electronic communication device 3 through a transmitter interface 21' and a receiver interface 23' of a first interface module 17'. The second transceiver 13 communicates through a transmitter interface 21" and a receiver interface 23" of a second interface module 17".

It is to be appreciated that in further variations, the transmitter interface 21 and receiver interface 23 may be separate modules (i.e. part of separate interface modules 17, 17', 17").

Figure 7:
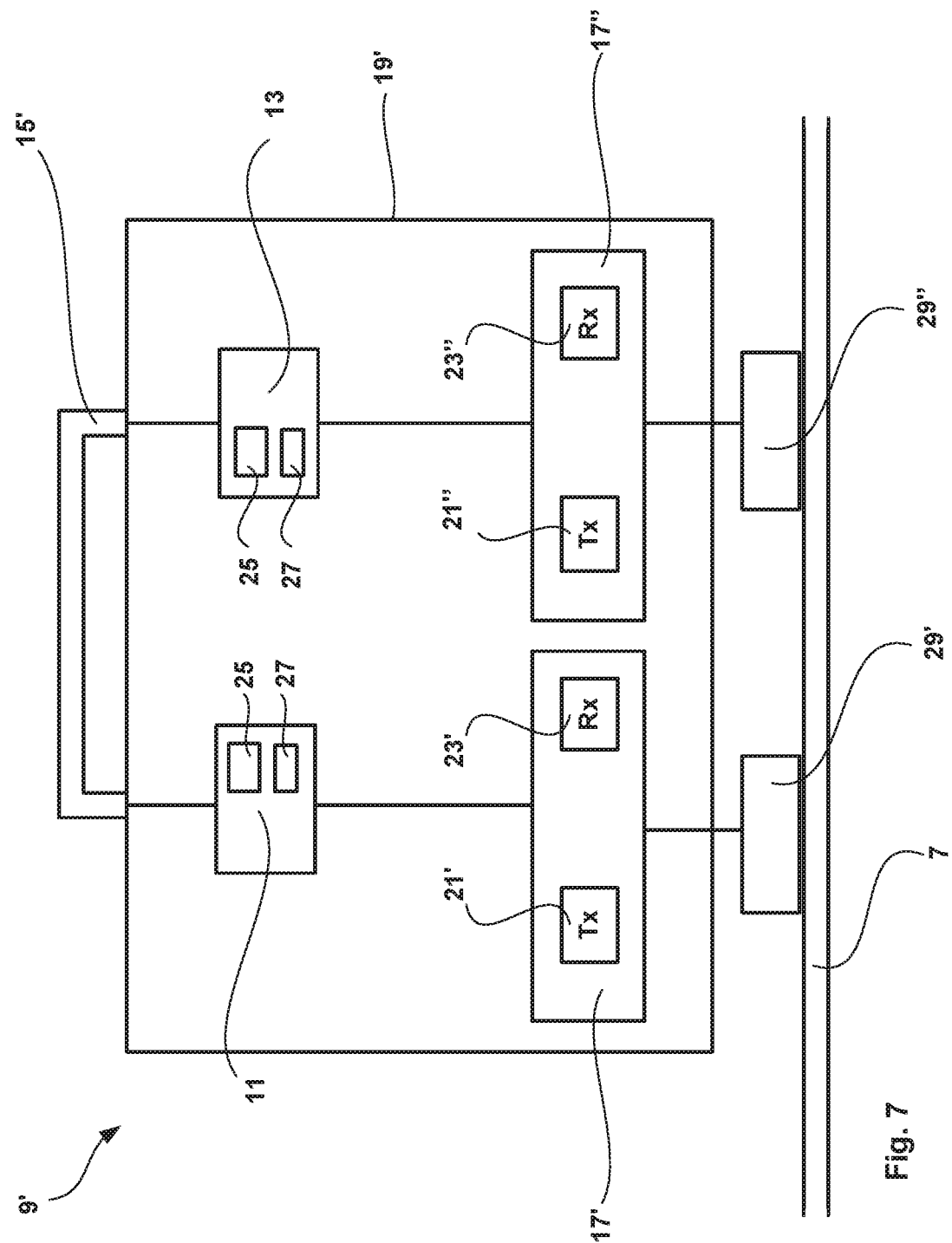
FIG. 7 is another example of a repeater.

In the repeater 9' illustrated in FIG. 7, the repeater communications channel 15' includes a wired communication channel external of the enclosure 19'. The wired communication channel may include a category 5 cable operatively connected between the first and second PLC transceivers 11, 13.

A Variation of the Network 300

Figure 8:
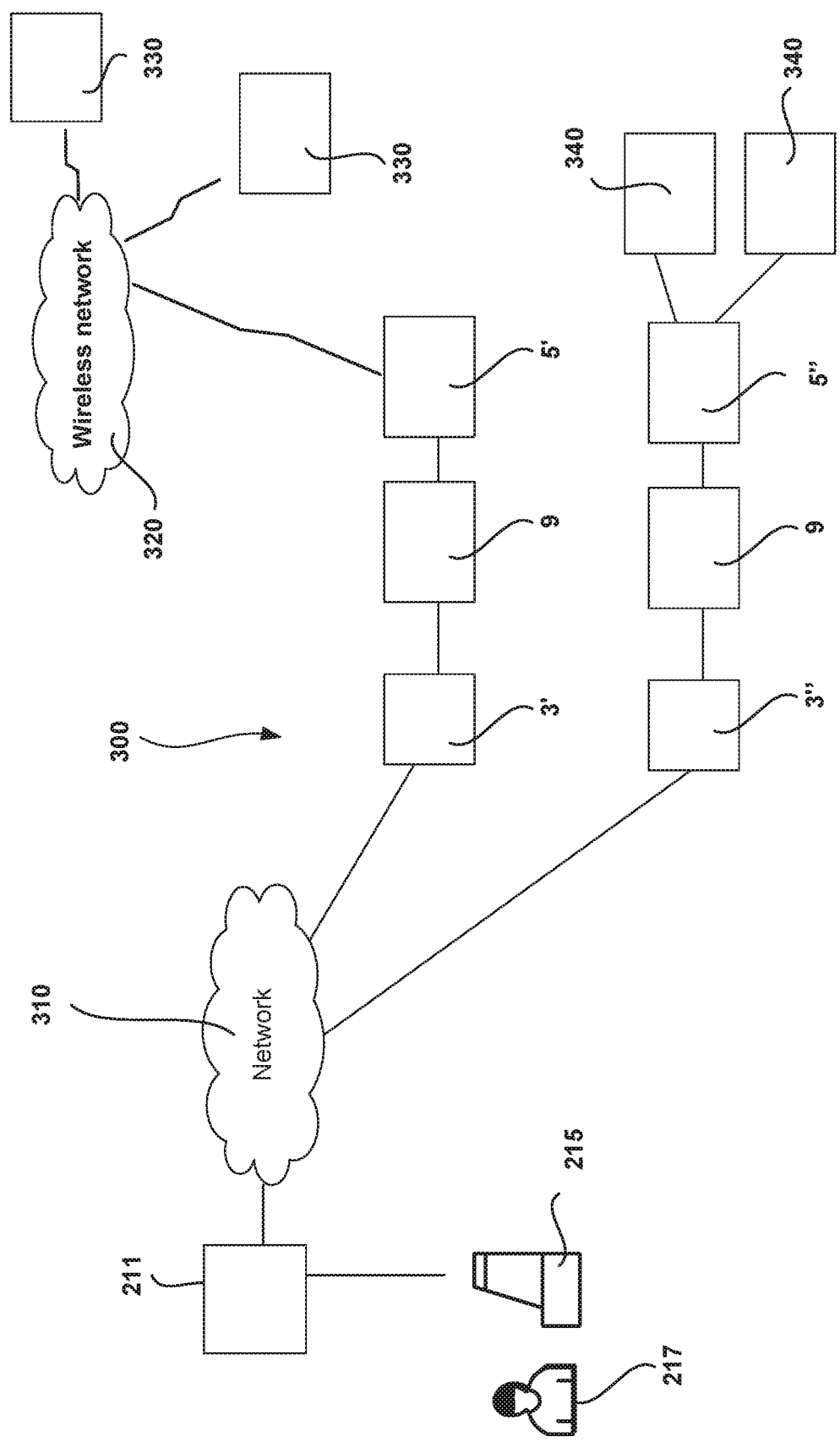
FIG. 8 is an example of a communications network.

An example of a network 300 having the repeater 9 is illustrated in FIG. 8. In this example, the network includes a first communications network 310 to connect node 211, first electronic communication devices 3', 3". The first electronic communications devices 3', 3" are in communication with respective second electronic communication devices 5' 5" via repeaters 9' as discussed above. Thus the second electronic communication devices 5', 5" may also be considered nodes of the network 310.

In one example, the second electronic communication device 5' includes, or is connected to, a router. The router may be a wireless router to provide a wireless network 320. In turn, other electronic device 330 may be connected to the wireless network 320. This may allow the other electronic devices 330 to be in communication with other nodes in the network 300. In one example, the second electronic communication device 5' may be associated with a mobile mining machine 202, such that the wireless network 320 is provided at, and around, the mobile mining machine 202. This may allow electronic devices 330, in proximity to the mobile mining machine 202, to be connected to the network 300. Such electronic devices 330 may include sensor systems, control systems, actuator systems, computer, mobile communication devices, etc.

In another example, the second electronic communication device 5" is in communication with one or more other electronic devices 340 via a physical medium. This may, for example, include electronic devices onboard a mobile mining machine 202.

Variation of the Repeater with Three PLC Transceivers

Figure 9:
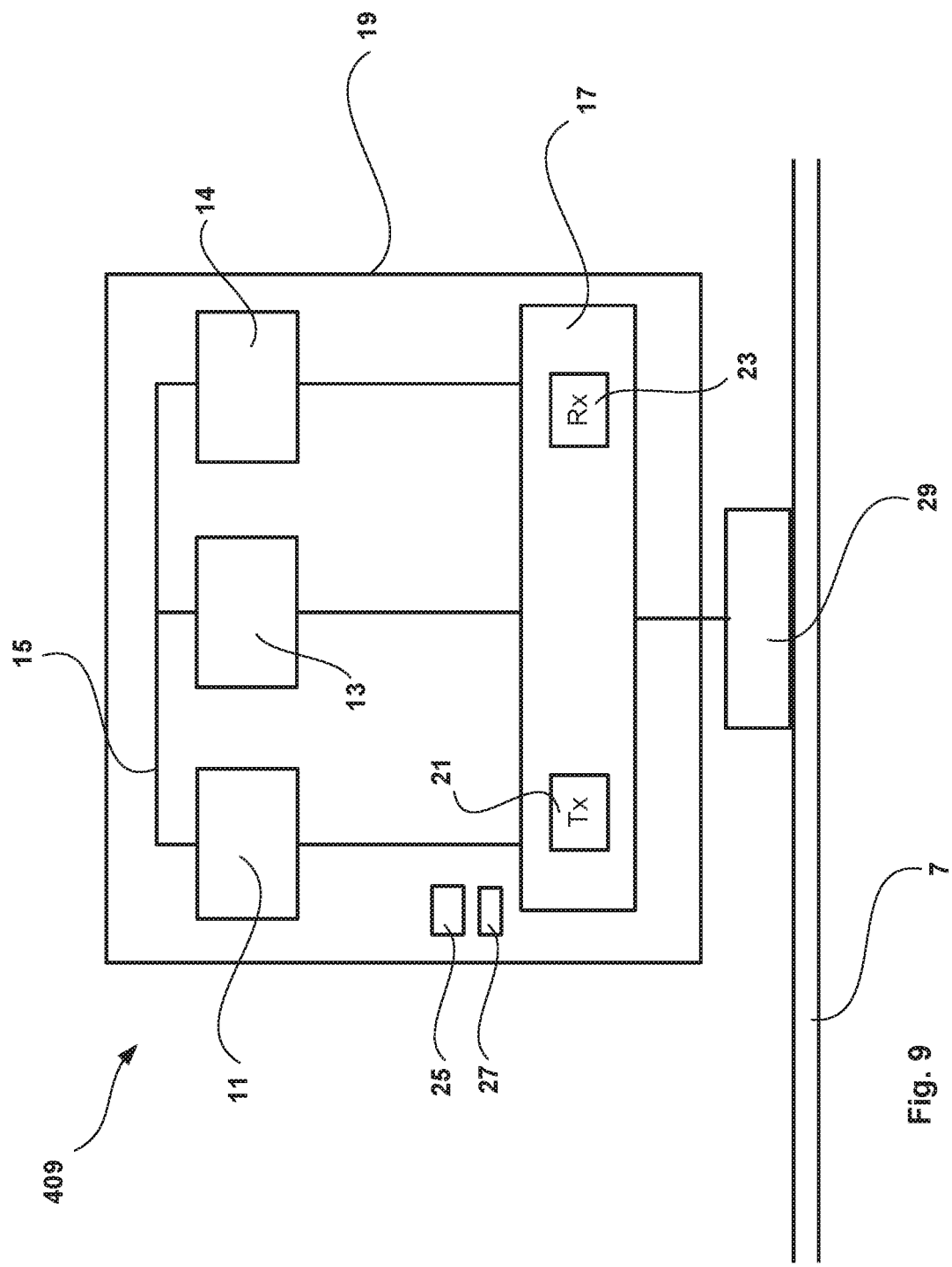
FIG. 9 is another example of a repeater with three PLC transceivers.

A variation of the repeater 409 will now be described with reference to FIGS. 9 and 10. Features that are the same, or similar, to the repeater described above have been given the same reference numbers. Notably in this variation, the repeater 409 has a third PLC transceiver 14. The third PLC transceiver 14 communicates with a third electronic communication device 6, over the power-line 7, that will be described in further detail below. The third PLC transceiver 14 also communicates with the first PLC transceiver 11 and the second PLC transceiver over the repeater communication channel 15.

Figure 10:
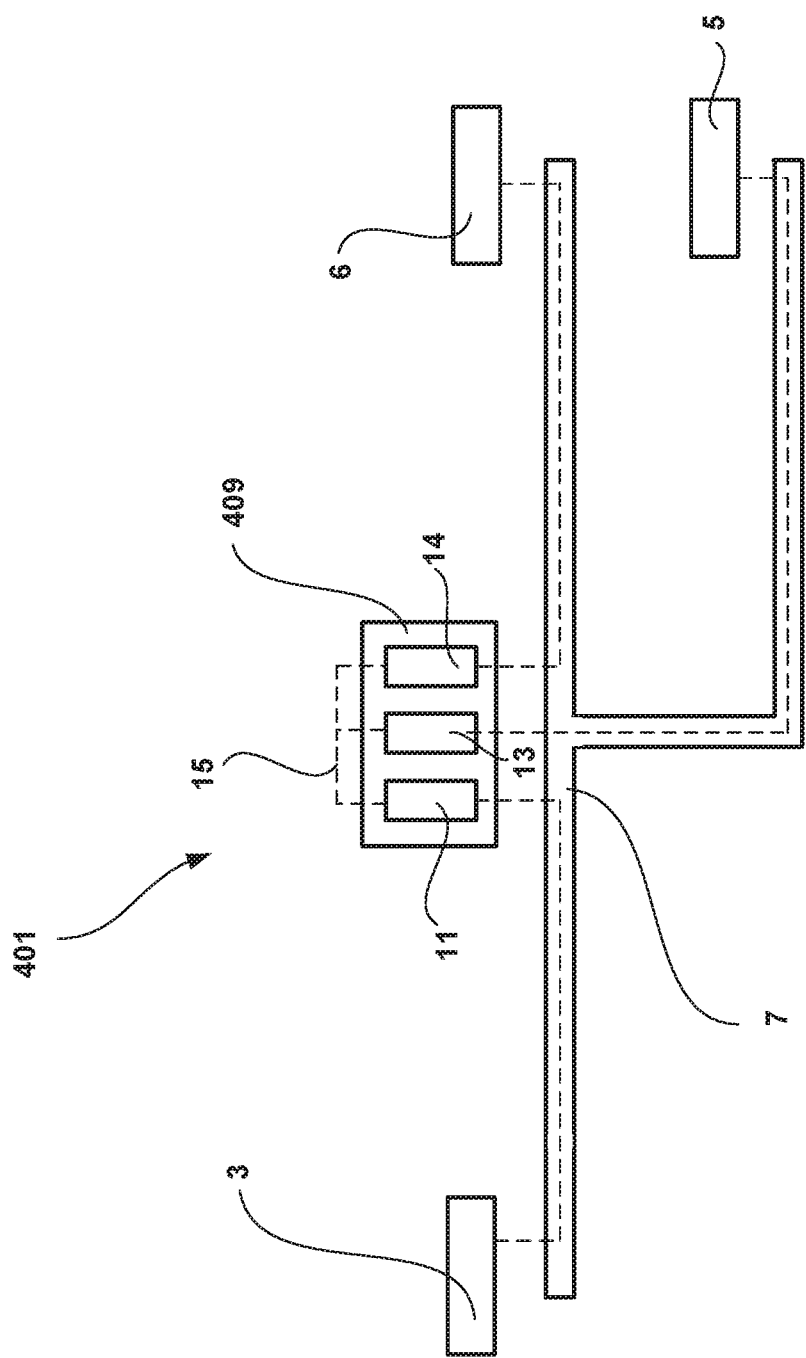
FIG. 10 is another example of a communications network having the repeater in FIG. 9.

FIG. 10 shows a system 401 for data communication with the repeater 409. Importantly, this shows the third electronic communication device 6 that communicates with the third PLC transceiver 14. This allows the third electronic communication device 6 to communicate with first electronic communication device 3 and/or the second electronic communication device 5 via the repeater 409.

A third channel identifier may be associated with the third PLC transceiver 14, to communicate with the third electronic communication device 6. The third channel identifier may be a third NMK.

The repeater 409 may allow data communication between the second electronic communication device 5 and the third electronic communication device 6. In particular, it may allow communication between the second and third electronic communication devices 5, 6 via the repeater 409, and without relying on the data to be first communicated through the first electronic communication device 3.

In one example implementation, the second electronic communication device 5 may be associated with a first mobile mining machine and the third electronic communication device 6 may be associated with a second mobile mining machine. Thus the system 401 may allow the first and second mobile mining machine to have data communication via the repeater 409 without relying on data communication to pass other nodes of the network.

In the above example of the repeater 409, there are three PLC transceivers 11, 13, 14. However, it is to be appreciated that additional PLC transceivers could be provided in the repeater for communication with additional electronic communication devices based on the principles described herein.

Processing Device

Figure 11:
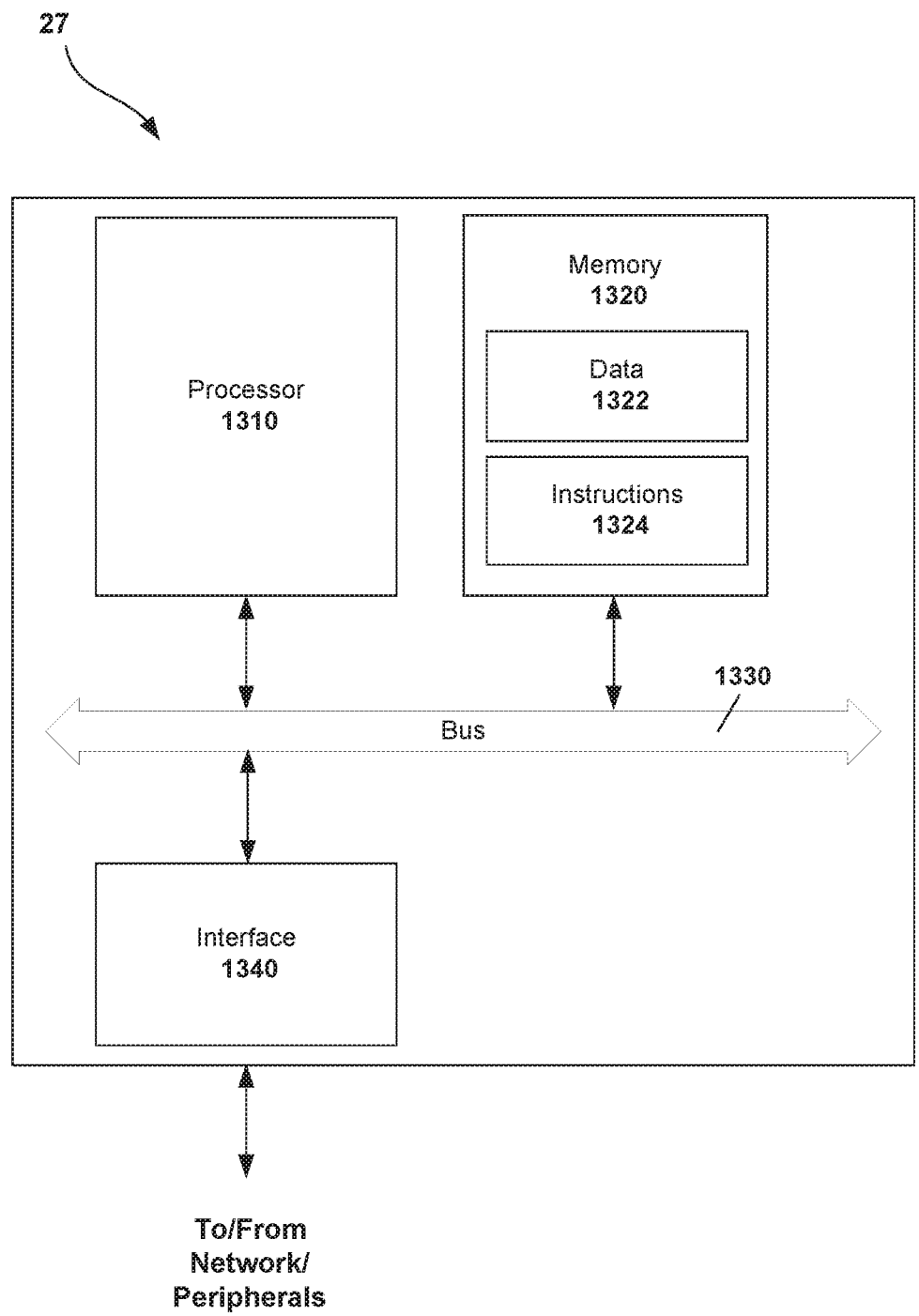
FIG. 11 is an example of a processing device.

FIG. 11 illustrates an example of a processing device 27 that may be provided in the repeater 9, 9'. The processing device may be in the form of a computer. The processing device 27 includes a processor 1310, a memory 1320 and an interface device 1340 that communicate with each other via a bus 1330. It is to be appreciated that the interface 1340 may be one or more interfaces. The memory 1320 may store instructions 1324 and data 1322 for implementing the method 100 described above, and the processor 1310 performs the instructions from the memory 1320 to implement the method 100. The interface device 1340 facilitates communication with the communications network 213 and, in some examples, with a user interface and other peripherals (such as interface module 17). In some examples, the interface 1340 also facilitates communication to the repeater communication channel 15 (for example, via an Ethernet interface, which may be integral or separate to interface 1340). In some examples, the processing device 27 is separate to the PLC transceivers 11, 23 and the processing device 27 may communicate with the PLC transceivers 11, 23 via the bus 1330 or the interface 1340. In yet other examples, the PLC transceivers 11, 23 may include the processing device 27.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A repeater for facilitating data communication, over a power-line, between a first electronic communication device and a second electronic communication device, the repeater comprising:
    a first power-line communication (PLC) transceiver to communicate with the first electronic communication device over the power-line;
    a second PLC transceiver to communicate with the second electronic communication device over the power-line;
    a repeater communication channel wherein the first PLC transceiver communicates with the second PLC transceiver over the repeater communication channel; and
    a common interface module to send and receive broadband over power-line signals to the power-line via a common coupler, wherein the common interface module comprises:
    a transmitter interface to receive signals from the first and second PLC transceivers and perform signal conditioning suitable to inject the received broadband over power-line signals, via the common coupler, to the power-line; and
    a receiver interface to receive, via the common coupler, broadband over power-line signals from the power-line and perform signal conditioning suitable to be received by the first and second PLC transceivers;
    wherein both the first and second PLC transceivers communicate with the respective first and second electronic communication devices through the common interface module.

2. A repeater according to claim 1 wherein the common interface module is operative in:
    a first mode to send the broadband over power-line signal; or a second mode to receive the broadband over power-line signal, wherein the common interface module alternates to operate in either the first or second mode.

3. A repeater according to claim 1 wherein data communication is by half-duplex or full-duplex emulation.

4. A repeater according to claim 1 further comprising:
a memory to store:
a first channel identifier, associated with the first PLC transceiver, to communicate with the first electronic communication device; and
a second channel identifier, associated with the second PLC transceiver, to communicate with the second electronic communication device.

5. A repeater according to claim 4 wherein the first channel identifier comprises a first network membership key (NMK) and the second channel identifier comprises a second NMK.

6. A repeater according to claim 5 wherein the repeater communication channel is a wired communication channel between the first and second PLC transceivers.

7. A repeater according to claim 6, wherein the repeater is a repeater in an underground communication network, and comprises a flameproof protective enclosure.

8. A repeater according to claim 1 for facilitating data communication, over a power-line, between the first electronic communication device, the second electronic communication device and a third electronic communication device, the repeater further comprising:
a third PLC transceiver to communicate with the third electronic communication device over the power-line, wherein the third PLC transceiver communicates with the first PLC transceiver and the second PLC transceiver over a data communications channel of the repeater.

9. A system for data communication and power transmission, the system comprising:
a first electronic communication device;
a second electronic communication device;
a power-line for transmission of power; and
a repeater according to claim 1 wherein the first electronic communication device communicates with the repeater; and the repeater communicates with the second electronic communication device to facilitate data communication between the first electronic communication device and the second electronic communication device.

10. A system according to claim 9 further comprising a signal coupler configured to electrically couple the common interface module to conductors of the power-line.

11. A system of claim 9 wherein at least one of the first electronic communication device, the second electronic communication device, and the repeater is located at or proximal to a mobile mining machine to facilitate data communication with the mobile mining machine, and wherein at least one of the first electronic communication device, the second electronic communication device, and the repeater is located at or proximal to a distribution control box and/or power substation of a power-line network.

12. A method of facilitating data communication, over a power-line, between a first electronic communication device and a second electronic communication device, the method comprising:
receiving, at a common interface device via a common coupler connected to the power-line, broadband over power-line signals containing first data from the first electronic communication device;
performing signal conditioning, by a receiver interface of the common interface device, of the received broadband over power-line signals;
receiving, with a first power-line communication (PLC) transceiver, first data, from the receiver interface of the common interface device;
sending, with the first PLC transceiver, the first data, over a repeater communication channel, to a second PLC transceiver;
receiving, with the second PLC transceiver, the first data from the first PLC transceiver;
sending, with the second PLC transceiver, the first data, to a transmitter interface of the common interface device;
performing signal conditioning, by the transmitter interface, to generate a further broadband over power-line signal containing the first data; and
sending, by the common interface device, the further broadband over power-line signal containing the first data to the second electronic communication device via the common coupler and power-line.

13. A method according to claim 12, further comprising:
receiving, at the common interface device via the common coupler, broadband over power-line signals containing second data from the second electronic communication device;
performing signal conditioning, by the receiver interface of the common interface device, of the received broadband over power-line signal containing second data;
receiving, with the second PLC transceiver, second data, from the receiver interface of the common interface device;
sending, with the second PLC transceiver, the second data, over the repeater communication channel, to the first PLC transceiver;
receiving, with the first PLC transceiver, the second data from the second PLC transceiver;
sending, with the first PLC transceiver, the second data, to the transmitter interface of the common interface device;
performing signal conditioning, by the transmitter interface, to generate a further broadband over power-line signal containing the second data; and
sending, by the common interface device, the further broadband over power-line signal containing the second data to the first electronic communication device via the common coupler and power-line.

14. A method according to claim 13, wherein the common interface device operates in:
a first mode to send the first or second data; or
a second mode to receive the first or second data,
wherein the common interface device alternates to operate in either the first or second mode.

15. A method according to claim 12, wherein data communication is by half-duplex or full-duplex emulation.

16. A method according to claim 13, wherein:
sending and receiving the first and second data between first PLC transceiver and the first electronic communication device is associated with a first channel identifier; and
sending and receiving the second and first data between the second PLC transceiver and the second electronic communication device is associated with a second channel identifier.

17. A method according to claim 16 wherein the first channel identifier comprises a first network membership key (NMK) and the second channel identifier comprises a second NMK.

18. A method according to claim 16, further comprising configuring a data communication system, over a power-line, between the first electronic communication device and the second electronic communication device, wherein:
- the first electronic communication device is in communication, over the power-line, with the first PLC transceiver;
- the second electronic communication device is in communication, over the power-line, with the second PLC transceiver, and wherein the first PLC transceiver is in communication, over the repeater communication channel, with the second PLC transceiver, and wherein both the first and second PLC transceivers communicate with respective first and second electronic communication devices through the common interface device with broadband over power-line signals, the method comprising:
- storing, in a memory, the first channel identifier associated with the first PLC transceiver to communicate with the first electronic communication device; and
- storing, in a memory, the second channel identifier associated with the second PLC transceiver to communicate with the second electronic communication device.

19. A method according to claim 18 further comprising:
- receiving the first channel identifier, wherein the first channel identifier comprises a first network membership key (NMK); and
- receiving the second channel identifier, wherein the second channel identifier comprises a second NMK.

20. A method according to claim 18 further comprising:
- generating the first channel identifier and second channel identifier.

21. A non-transitory computer readable storage medium storing computer program comprising machine-readable instructions to cause a processing device to implement the method according to claim 18.

* * * * *